(12) United States Patent
Su

(10) Patent No.: US 11,503,549 B2
(45) Date of Patent: Nov. 15, 2022

(54) POWER ALLOCATION METHOD AND RELATED DEVICE

(71) Applicant: HUAWEI TECHNOLOGIES CO., LTD., Guangdong (CN)

(72) Inventor: Liyan Su, Beijing (CN)

(73) Assignee: HUAWEI TECHNOLOGIES CO., LTD.

( * ) Notice: Subject to any disclaimer, the term of this patent is extended or adjusted under 35 U.S.C. 154(b) by 0 days.

(21) Appl. No.: 17/131,167

(22) Filed: Dec. 22, 2020

(65) Prior Publication Data

US 2021/0120499 A1 Apr. 22, 2021

Related U.S. Application Data

(63) Continuation of application No. PCT/CN2018/093143, filed on Jun. 27, 2018.

(51) Int. Cl.
*H04W 52/14* (2009.01)
*H04B 7/0456* (2017.01)
*H04W 52/42* (2009.01)

(52) U.S. Cl.
CPC .......... *H04W 52/14* (2013.01); *H04B 7/0456* (2013.01); *H04W 52/42* (2013.01)

(58) Field of Classification Search
CPC .. H04B 7/0426; H04B 7/0486; H04B 7/0456; H04B 7/0482; H04B 17/382;
(Continued)

(56) References Cited

U.S. PATENT DOCUMENTS

2008/0232449 A1* 9/2008 Khan ................ H04L 25/03343
375/220
2010/0246705 A1* 9/2010 Shin .................. H04W 72/0446
375/267
(Continued)

FOREIGN PATENT DOCUMENTS

CN 102264123 A 11/2011
CN 102300301 A 12/2011
(Continued)

OTHER PUBLICATIONS

Motorola, UL Power Control for Multi-Antenna UE. 3GPP TSG RAN1#60, San Francisco, USA, Feb. 22 26, 2010, R1-101115, 7 pages.
(Continued)

*Primary Examiner* — Lana N Le
(74) *Attorney, Agent, or Firm* — Womble Bond Dickinson (US) LLP

(57) ABSTRACT

Embodiments of this application provide a power allocation method and a related device. The method includes: receiving, by a terminal device, first downlink control information sent by a network device, where the first downlink control information includes first power allocation information for a plurality of transport layers; determining, by the terminal device, a first transmit power of each of the plurality of transport layers based on the first power allocation information; and sending, by the terminal device, first uplink data based on the first transmit power of each transport layer. Transmission efficiency of a system can be improved by implementing the embodiments of this application.

17 Claims, 11 Drawing Sheets

| Bit field mapped to index | Precoding matrix index | Bit field mapped to index | Precoding matrix index | Bit field mapped to index | Precoding matrix index |
|---|---|---|---|---|---|
| 0 | 1 layer: TPMI=0 | 0 | 1 layer: TPMI=0 | 0 | 1 layer: TPMI=0 |
| 1 | 1 layer: TPMI=1 | 1 | 1 layer: TPMI=1 | 1 | 1 layer: TPMI=1 |
| ... | ... | ... | ... | ... | ... |
| 3 | 1 layer: TPMI=3 | 3 | 1 layer: TPMI=3 | 3 | 1 layer: TPMI=3 |
| 4 | 2 layers: TPMI=0 | 4 | 2 layers: TPMI=0 | 4 | 2 layers: TPMI=0 |
| ... | ... | ... | ... | ... | ... |
| 9 | 2 layers: TPMI=5 | 9 | 2 layers: TPMI=5 | 9 | 2 layers: TPMI=5 |
| 10 | 3 layers: TPMI=0 | 10 | 3 layers: TPMI=0 | 10 | 3 layers: TPMI=0 |
| 11 | 4 layers: TPMI=0 | 11 | 4 layers: TPMI=0 | 11 | 4 layers: TPMI=0 |
| 12 | 1 layer: TPMI=4 | 12 | 1 layer: TPMI=4 | 12-15 | reserved |
| ... | ... | ... | ... | | |
| 19 | 1 layer: TPMI=11 | 19 | 1 layer: TPMI=11 | | |
| 20 | 2 layers: TPMI=6 | 20 | 2 layers: TPMI=6 | | |
| ... | ... | ... | ... | | |
| 27 | 2 layers: TPMI=13 | 27 | 2 layers: TPMI=13 | | |
| 28 | 3 layers: TPMI=1 | 28 | 3 layers: TPMI=1 | | |
| 29 | 3 layers: TPMI=2 | 29 | 3 layers: TPMI=2 | | |
| 30 | 4 layers: TPMI=1 | 30 | 4 layers: TPMI=1 | | |
| 31 | 4 layers: TPMI=2 | 31 | 4 layers: TPMI=2 | | |
| 32 | 1 layer: TPMI=12 | | | | |
| ... | ... | | | | |
| 47 | 1 layer: TPMI=27 | | | | |
| 48 | 2 layers: TPMI=14 | | | | |
| ... | ... | | | | |
| 55 | 2 layers TPMI=21 | | | | |
| 56 | 3 layers: TPMI=3 | | | | |
| ... | ... | | | | |
| 59 | 3 layers: TPMI=6 | | | | |
| 60 | 4 layers: TPMI=3 | | | | |
| 61 | 4 layers: TPMI=4 | | | | |
| 62-63 | reserved | | | | |

(58) Field of Classification Search
CPC ... H04B 7/0639; H04B 7/0478; H04W 52/14; H04W 52/42; H04W 52/242; H04W 52/146; H04W 52/367; H04W 88/02
See application file for complete search history.

(56) References Cited

U.S. PATENT DOCUMENTS

| | | | |
|---|---|---|---|
| 2011/0103504 A1* | 5/2011 | Ma | H04B 7/063 375/267 |
| 2011/0274022 A1* | 11/2011 | Chen | H04B 7/0413 370/311 |
| 2013/0229906 A1* | 9/2013 | Akkarakaran | H04W 28/04 370/216 |
| 2016/0150490 A1* | 5/2016 | Ouchi | H04W 52/146 455/522 |
| 2017/0164299 A1* | 6/2017 | Shimezawa | H04W 52/146 |
| 2017/0180097 A1 | 6/2017 | Zhu et al. | |
| 2019/0045460 A1* | 2/2019 | Muruganathan | H04B 7/0617 |
| 2019/0165841 A1* | 5/2019 | Dong | H04B 7/0456 |
| 2021/0084596 A1* | 3/2021 | Lee | H04W 52/143 |
| 2021/0227472 A1* | 7/2021 | Liu | H04B 7/0456 |

FOREIGN PATENT DOCUMENTS

| | | |
|---|---|---|
| CN | 104703191 A | 6/2015 |
| CN | 106465365 A | 2/2017 |
| CN | 107231694 A | 10/2017 |
| CN | 107689859 A | 2/2018 |
| WO | 2014125892 A1 | 8/2014 |
| WO | 2018034585 A1 | 2/2018 |

OTHER PUBLICATIONS

Samsung, UL SU-MIMO power control. 3GPP TSG RAN WG1 Meeting #60bis, Beijing, China, Apr. 12 16, 2010, R1-102182, 3 pages.

3GPP TS 36.213 V14.6.0 (Mar. 2018), 3rd Generation Partnership Project; Technical Specification Group Radio Access Network; Evolved Universal Terrestrial Radio Access (E-UTRA); Physical layer procedures(Release 14), 465 pages.

* cited by examiner

| Bit field mapped to index | Precoding matrix index | Bit field mapped to index | Precoding matrix index |
|---|---|---|---|
| 0 | 1 layer: TPMI=0 | 0 | 1 layer: TPMI=0 |
| 1 | 1 layer: TPMI=1 | 1 | 1 layer: TPMI=1 |
| 2 | 2 layers: TPMI=0 | 2 | 2 layers: TPMI=0 |
| 3 | 1 layer: TPMI=2 | 3 | reserved |
| 4 | 1 layer: TPMI=3 | | |
| 5 | 1 layer: TPMI=4 | | |
| 6 | 1 layer: TPMI=5 | | |
| 7 | 2 layers: TPMI=1 | | |
| 8 | 2 layers: TPMI=2 | | |
| 9-15 | reserved | | |

FIG. 5

| TPMI index | One transport layer, ordered from left to right in increasing order of TPMI index | | | | | | | |
|---|---|---|---|---|---|---|---|---|
| 0-5 | $\frac{1}{\sqrt{2}}\begin{bmatrix}1\\0\end{bmatrix}$ | $\frac{1}{\sqrt{2}}\begin{bmatrix}0\\1\end{bmatrix}$ | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ | - | - |

FIG. 6(A)

| TPMI index | Two transport layers, ordered from left to right in increasing order of TPMI index | | | |
|---|---|---|---|---|
| 0-2 | $\frac{1}{\sqrt{2}}\begin{bmatrix}1 & 0\\0 & 1\end{bmatrix}$ | $\frac{1}{2}\begin{bmatrix}1 & 1\\1 & -1\end{bmatrix}$ | $\frac{1}{2}\begin{bmatrix}1 & 1\\j & -j\end{bmatrix}$ | |

FIG. 6(B)

| Bit field mapped to index | Precoding matrix index | Bit field mapped to index | Precoding matrix index | Bit field mapped to index | Precoding matrix index |
|---|---|---|---|---|---|
| 0 | 1 layer: TPMI=0 | 0 | 1 layer: TPMI=0 | 0 | 1 layer: TPMI=0 |
| 1 | 1 layer: TPMI=1 | 1 | 1 layer: TPMI=1 | 1 | 1 layer: TPMI=1 |
| ... | ... | ... | ... | ... | ... |
| 3 | 1 layer: TPMI=3 | 3 | 1 layer: TPMI=3 | 3 | 1 layer: TPMI=3 |
| 4 | 2 layers: TPMI=0 | 4 | 2 layers: TPMI=0 | 4 | 2 layers: TPMI=0 |
| ... | ... | ... | ... | ... | ... |
| 9 | 2 layers: TPMI=5 | 9 | 2 layers: TPMI=5 | 9 | 2 layers: TPMI=5 |
| 10 | 3 layers: TPMI=0 | 10 | 3 layers: TPMI=0 | 10 | 3 layers: TPMI=0 |
| 11 | 4 layers: TPMI=0 | 11 | 4 layers: TPMI=0 | 11 | 4 layers: TPMI=0 |
| 12 | 1 layer: TPMI=4 | 12 | 1 layer: TPMI=4 | 12-15 | reserved |
| ... | ... | ... | ... | | |
| 19 | 1 layer: TPMI=11 | 19 | 1 layer: TPMI=11 | | |
| 20 | 2 layers: TPMI=6 | 20 | 2 layers: TPMI=6 | | |
| ... | ... | ... | ... | | |
| 27 | 2 layers: TPMI=13 | 27 | 2 layers: TPMI=13 | | |
| 28 | 3 layers: TPMI=1 | 28 | 3 layers: TPMI=1 | | |
| 29 | 3 layers: TPMI=2 | 29 | 3 layers: TPMI=2 | | |
| 30 | 4 layers: TPMI=1 | 30 | 4 layers: TPMI=1 | | |
| 31 | 4 layers: TPMI=2 | 31 | 4 layers: TPMI=2 | | |
| 32 | 1 layer: TPMI=12 | | | | |
| ... | ... | | | | |
| 47 | 1 layer: TPMI=27 | | | | |
| 48 | 2 layers: TPMI=14 | | | | |
| ... | ... | | | | |
| 55 | 2 layers: TPMI=21 | | | | |
| 56 | 3 layers: TPMI=3 | | | | |
| ... | ... | | | | |
| 59 | 3 layers: TPMI=6 | | | | |
| 60 | 4 layers: TPMI=3 | | | | |
| 61 | 4 layers: TPMI=4 | | | | |
| 62-63 | reserved | | | | |

FIG. 7

| TPMI index | One transport layer, ordered from left to right in increasing order of TPMI index | | | | | | | |
|---|---|---|---|---|---|---|---|---|
| 0-7 | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ | $\frac{1}{2}\begin{bmatrix}1\\1\\1\\-1\end{bmatrix}$ | $\frac{1}{2}\begin{bmatrix}1\\1\\j\\j\end{bmatrix}$ | $\frac{1}{2}\begin{bmatrix}1\\1\\-1\\1\end{bmatrix}$ | $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ | $\frac{1}{2}\begin{bmatrix}1\\j\\j\\1\end{bmatrix}$ | $\frac{1}{2}\begin{bmatrix}1\\j\\-1\\-j\end{bmatrix}$ | $\frac{1}{2}\begin{bmatrix}1\\j\\-j\\-1\end{bmatrix}$ | $\frac{1}{2}\begin{bmatrix}1\\-1\\1\\1\end{bmatrix}$ | $\frac{1}{2}\begin{bmatrix}1\\-1\\j\\-j\end{bmatrix}$ | $\frac{1}{2}\begin{bmatrix}1\\-1\\-1\\-1\end{bmatrix}$ | $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ | $\frac{1}{2}\begin{bmatrix}1\\-j\\j\\-1\end{bmatrix}$ | $\frac{1}{2}\begin{bmatrix}1\\-j\\-1\\j\end{bmatrix}$ | $\frac{1}{2}\begin{bmatrix}1\\-j\\-j\\1\end{bmatrix}$ | - | - | - | - |

FIG. 8(A)

| TPMI index | Two transport layers, ordered from left to right in increasing order of TPMI index | | | |
|---|---|---|---|---|
| 0-3 | $\frac{1}{2}\begin{bmatrix}1&0\\0&1\\0&0\\0&0\end{bmatrix}$ | $\frac{1}{2}\begin{bmatrix}1&0\\0&0\\0&1\\0&0\end{bmatrix}$ | $\frac{1}{2}\begin{bmatrix}1&0\\0&0\\0&0\\0&1\end{bmatrix}$ | $\frac{1}{2}\begin{bmatrix}0&0\\1&0\\0&1\\0&0\end{bmatrix}$ |
| 4-7 | $\frac{1}{2}\begin{bmatrix}0&0\\1&0\\0&0\\0&1\end{bmatrix}$ | $\frac{1}{2}\begin{bmatrix}0&0\\0&0\\1&0\\0&1\end{bmatrix}$ | $\frac{1}{2}\begin{bmatrix}1&0\\0&1\\1&0\\0&-j\end{bmatrix}$ | $\frac{1}{2}\begin{bmatrix}1&0\\0&1\\1&0\\0&j\end{bmatrix}$ |
| 8-11 | $\frac{1}{2}\begin{bmatrix}1&0\\0&1\\-j&0\\0&1\end{bmatrix}$ | $\frac{1}{2}\begin{bmatrix}1&0\\0&1\\-j&0\\0&-1\end{bmatrix}$ | $\frac{1}{2}\begin{bmatrix}1&0\\0&1\\-1&0\\0&-j\end{bmatrix}$ | $\frac{1}{2}\begin{bmatrix}1&0\\0&1\\-1&0\\0&j\end{bmatrix}$ |
| 12-15 | $\frac{1}{2}\begin{bmatrix}1&0\\0&1\\j&0\\0&1\end{bmatrix}$ | $\frac{1}{2}\begin{bmatrix}1&0\\0&1\\j&0\\0&-1\end{bmatrix}$ | $\frac{1}{2\sqrt{2}}\begin{bmatrix}1&1\\1&1\\1&-1\\1&-1\end{bmatrix}$ | $\frac{1}{2\sqrt{2}}\begin{bmatrix}1&1\\1&1\\j&-j\\j&-j\end{bmatrix}$ |
| 16-19 | $\frac{1}{2\sqrt{2}}\begin{bmatrix}1&1\\j&j\\1&-1\\j&-j\end{bmatrix}$ | $\frac{1}{2\sqrt{2}}\begin{bmatrix}1&1\\j&j\\j&-j\\-1&1\end{bmatrix}$ | $\frac{1}{2\sqrt{2}}\begin{bmatrix}1&1\\-1&-1\\1&-1\\-1&1\end{bmatrix}$ | $\frac{1}{2\sqrt{2}}\begin{bmatrix}1&1\\-1&-1\\j&-j\\-j&j\end{bmatrix}$ |
| 20-21 | $\frac{1}{2\sqrt{2}}\begin{bmatrix}1&1\\-j&-j\\1&-1\\-j&j\end{bmatrix}$ | $\frac{1}{2\sqrt{2}}\begin{bmatrix}1&1\\-j&-j\\j&-j\\1&-1\end{bmatrix}$ | - | - |

FIG. 8(B)

| TPMI index | Three transport layers, ordered from left to right in increasing order of TPMI index | | | |
|---|---|---|---|---|
| 0-3 | $\frac{1}{2}\begin{bmatrix}1&0&0\\0&1&0\\0&0&1\\0&0&0\end{bmatrix}$ | $\frac{1}{2}\begin{bmatrix}1&0&0\\0&1&0\\1&0&0\\0&0&1\end{bmatrix}$ | $\frac{1}{2}\begin{bmatrix}1&0&0\\0&1&0\\-1&0&0\\0&0&1\end{bmatrix}$ | $\frac{1}{2\sqrt{3}}\begin{bmatrix}1&1&1\\1&-1&1\\1&1&-1\\1&-1&-1\end{bmatrix}$ |
| 4-6 | $\frac{1}{2\sqrt{3}}\begin{bmatrix}1&1&1\\1&-1&1\\j&j&-j\\j&-j&-j\end{bmatrix}$ | $\frac{1}{2\sqrt{3}}\begin{bmatrix}1&1&1\\-1&1&-1\\1&1&-1\\-1&1&1\end{bmatrix}$ | $\frac{1}{2\sqrt{3}}\begin{bmatrix}1&1&1\\-1&1&-1\\j&j&-j\\-j&j&j\end{bmatrix}$ | - |

FIG. 8(C)

| TPMI index | Four transport layers, ordered from left to right in increasing order of TPMI index | | | |
|---|---|---|---|---|
| 0-3 | $\frac{1}{2}\begin{bmatrix}1&0&0&0\\0&1&0&0\\0&0&1&0\\0&0&0&1\end{bmatrix}$ | $\frac{1}{2\sqrt{2}}\begin{bmatrix}1&1&0&0\\0&0&1&1\\1&-1&0&0\\0&0&1&-1\end{bmatrix}$ | $\frac{1}{2\sqrt{2}}\begin{bmatrix}1&1&0&0\\0&0&1&1\\j&-j&0&0\\0&0&j&-j\end{bmatrix}$ | $\frac{1}{4}\begin{bmatrix}1&1&1&1\\1&-1&1&-1\\1&1&-1&-1\\1&-1&-1&1\end{bmatrix}$ |
| 4 | $\frac{1}{4}\begin{bmatrix}1&1&1&1\\1&-1&1&-1\\j&j&-j&-j\\j&-j&-j&j\end{bmatrix}$ | - | - | - |

FIG. 8(D)

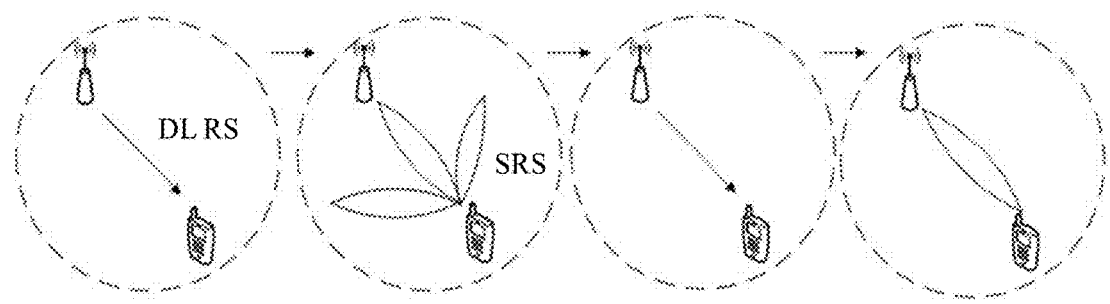

FIG. 9

POWER ALLOCATION METHOD AND RELATED DEVICE

CROSS-REFERENCE TO RELATED APPLICATIONS

This application is a continuation of International Application No. PCT/CN2018/093143, filed on Jun. 27, 2018, the disclosure of which is hereby incorporated by reference in its entirety.

TECHNICAL FIELD

This application relates to the field of wireless network technologies, and in particular, to a power allocation method and a related device.

BACKGROUND

A data transmission rate can be multiplied by using a multi-input multi-output (MIMO) technology in a fourth generation (4G) long term evolution (long term evolution, LTE) system and a fifth generation (5G) new radio (NR) system. Compared with a conventional single-antenna system in which, for example, both a transmitter and a receiver have only one antenna, in a MIMO system, a plurality of antennas are used on both the transmitter and the receiver for establishing a plurality of parallel transmission channels, so that transmission efficiency of the system, for example, bandwidth utilization, is multiplied in a unit time and a unit frequency band. A MIMO technology that supports transmission of a plurality of parallel channels is usually referred to as spatial multiplexing. Data is divided into a plurality of data streams, and the data streams are simultaneously sent, to improve a data transmission rate. In an existing LTE uplink system and an existing NR uplink system, power allocation between codewords (CW) is not supported. If a new generation NodeB (gNB) schedules a plurality of transport layers, user equipment (UE) considers by default that a same transmit power is used for all the transport layers for sending uplink data. Consequently, a transmission rate of the system is affected.

SUMMARY

Embodiments of this application provide a power allocation method and a related device, to allocate different transmit powers to different transport layers, thereby improving transmission efficiency of a system.

According to a first aspect, an embodiment of this application provides a power allocation method, including: A terminal device first receives first downlink control information sent by a network device, where the first downlink control information includes first power allocation information for a plurality of transport layers; then determines a first transmit power of each of the plurality of transport layers based on the first power allocation information; and finally sends first uplink data to the network device based on the first transmit power of each transport layer. The network device sends the power allocation information to the terminal device, to allocate different transmit powers to different transport layers, thereby improving transmission efficiency of a system.

In an embodiment, after receiving the first downlink control information, the terminal device may determine inter-layer power allocation capability information supported by each transport layer, and report the inter-layer power allocation capability information supported by each transport layer to the network device, so that the network device determines second power allocation information for the plurality of transport layers of the terminal device.

In another embodiment, the first downlink control information includes a precoding matrix indicator PMI or a spatial rank index SRI, and the terminal device may determine, based on the PMI or the SRI, precoding used by the plurality of transport layers. Then, an antenna port used by each transport layer is determined based on the precoding used by the plurality of transport layers, a maximum transmit power parameter of the antenna port of the terminal device is then obtained, and the inter-layer power allocation capability information is determined based on the maximum transmit power parameter of the antenna port.

In another embodiment, the first downlink control information further includes codeword-transport layer-precoding correspondence indication information, and the plurality of transport layers include at least two groups of transport layers. The terminal device may determine, based on the correspondence indication information, antenna ports used by the at least two groups of transport layers, and then determine the inter-layer power allocation capability information based on the antenna ports used by the at least two groups of transport layers.

In another embodiment, the inter-layer power allocation capability information may be determined based on the antenna ports used by the at least two groups of transport layers and a maximum transmit power parameter of the antenna port.

In another embodiment, when the precoding used by the plurality of transport layers is full coherent precoding or partial coherent precoding, and the antenna ports used by the at least two groups of transport layers are the same, power may be allocated in any proportion because the same antenna ports are used by different CWs for sending the uplink data, and the inter-layer power allocation capability information does not need to be reported. However, when the precoding used by the plurality of transport layers is non-coherent precoding, or the precoding used by the at least two groups of transport layers is partial coherent precoding and the antenna ports used by the at least two groups of transport layers are different, the terminal device needs to determine the inter-layer power allocation capability information supported by each transport layer, and report the inter-layer power allocation capability information supported by each transport layer to the network device.

In another embodiment, the terminal device may send the inter-layer power allocation capability information to the network device by using higher layer signaling, to reduce physical layer signaling overheads and improve information transmission reliability.

In another embodiment, the inter-layer power allocation capability information may be carried on a PUSCH scheduled by UL grant and sent to the network device, so that information transmission reliability is ensured, and a delay of information transmission can be reduced.

In another embodiment, the terminal device receives second downlink control information sent by the network device, where the second downlink control information includes second power allocation information for the plurality of transport layers; and the terminal device determines a second transmit power of each of the plurality of transport layers based on the second power allocation information; and sends second uplink data based on the second transmit power of each transport layer. The PMI or the SRI in the first downlink control information is the same as a PMI or an SRI in the second downlink control information. The network device sends the power allocation information to the terminal device, to allocate different transmit powers to different transport layers, thereby improving transmission efficiency of a system.

In another embodiment, the first power allocation information is identified as a default state 0.

In another embodiment, the first downlink control information includes a precoding matrix indicator PMI, and the terminal device determines, based on the PMI, precoding used by the plurality of transport layers. When the precoding used by the plurality of transport layers is full coherent precoding, the terminal device supports inter-layer power allocation, and may determine the first transmit power of each of the plurality of transport layers based on the first power allocation information.

In another embodiment, the first downlink control information includes a precoding matrix indicator PMI and codeword-transport layer-precoding correspondence indication information, and the plurality of transport layers include at least two groups of transport layers. The terminal device determines, based on the PMI, precoding used by the plurality of transport layers, and determines, based on the correspondence indication information, antenna ports used by the at least two groups of transport layers; and when the precoding used by the plurality of transport layers is partial coherent precoding, and the antenna ports used by the at least two groups of transport layers are the same, the terminal device supports inter-layer power allocation, and may determine the first transmit power of each of the plurality of transport layers based on the first power allocation information.

In another embodiment, if the terminal device does not support inter-layer power allocation, for example, the precoding is non-coherent precoding, or the precoding is partial coherent precoding and different antenna ports are used for a plurality of codewords, the terminal device determines whether an error occurs during decoding of the first downlink control information, for example, whether the power allocation information is used as a virtual information check bit. Alternatively, the terminal device re-parses the power allocation information in the downlink control information. For example, a bit field is used as a TPC field, to indicate an adjustment value of a transmit power for transmitting a PUSCH by UE compared with a transmit power for transmitting the PUSCH last time.

According to a second aspect, an embodiment of this application provides a power allocation method, including: A network device first sends first downlink control information to a terminal device, where the first downlink control information includes first power allocation information for a plurality of transport layers, and the first power allocation information is used to indicate the terminal device to determine a first transmit power of each of the plurality of transport layers and send first uplink data based on the first transmit power of each transport layer; and the network device receives the first uplink data sent by the terminal device. The network device sends the power allocation information to the terminal device, to allocate different transmit powers to different transport layers, thereby improving transmission efficiency of a system.

In an embodiment, the network device determines second power allocation information for the plurality of transport layers based on inter-layer power allocation capability information; and sends second downlink control information to the terminal device, where the second downlink control information includes the second power allocation information for the plurality of transport layers, and the second power allocation information is used to indicate the terminal device to determine a second transmit power of each of the plurality of transport layers and send second uplink data to the network device based on the second transmit power of each transport layer. A PMI or an SRI in the first downlink control information is the same as a PMI or an SRI in the second downlink control information. The network device sends the power allocation information to the terminal device, to allocate different transmit powers to different transport layers, thereby improving transmission efficiency of a system.

In another embodiment, the inter-layer power allocation capability information sent by the terminal device by using higher layer signaling is received. In this way, physical layer signaling overheads are reduced, and information transmission reliability is improved.

In another embodiment, in some scenarios, a time-varying characteristic of a channel is extremely slow, and the network device may estimate an uplink channel based on a combination of SRSs sent by the terminal device for a plurality of times, to obtain accurate uplink channel information, so that the power allocation information for the transport layers can be introduced into the downlink control information.

According to a third aspect, an embodiment of this application provides a network device. The network device is configured to implement the method and the functions performed by the network device in the first aspect, and is implemented by hardware/software. The hardware/software of the network device includes modules corresponding to the foregoing functions.

According to a fourth aspect, an embodiment of this application provides a terminal device. The user equipment is configured to implement the method and the functions performed by the terminal device in the second aspect, and is implemented by hardware/software. The hardware/software of the terminal device includes modules corresponding to the foregoing functions.

According to a fifth aspect, an embodiment of this application provides another terminal device, including a processor, a memory, and a communications bus. The communications bus is configured to implement connection and communication between the processor and the memory, and the processor executes a program stored in the memory to implement the operations in the power allocation method according to the first aspect.

In an embodiment, the terminal device provided in this application may include a corresponding module configured to perform behavior of the network device in the foregoing method and design. The module may be software and/or hardware.

According to a sixth aspect, an embodiment of this application provides another network device, including a processor, a memory, and a communications bus. The communications bus is configured to implement connection and communication between the processor and the memory, and the processor executes a program stored in the memory to implement the operations in the power allocation method according to the second aspect.

In an embodiment, the network device provided in this application may include a corresponding module configured to perform behavior of the user equipment in the foregoing method and design. The module may be software and/or hardware.

According to a seventh aspect, this application provides a computer-readable storage medium. The computer-readable storage medium stores an instruction, and when the instruction is run on a computer, the computer is enabled to perform the method according to the foregoing aspects.

According to an eighth aspect, this application provides a computer program product including an instruction. When the computer program product runs on a computer, the computer is enabled to perform the method according to the foregoing aspects.

BRIEF DESCRIPTION OF DRAWINGS

To describe the technical solutions in the embodiments of this application or in the background part more clearly, the following describes the accompanying drawings required for describing the embodiments of this application or the background part.

FIG. 5 is a schematic diagram of precoding information of two antenna ports and a quantity of layers according to an embodiment of this application;

FIG. 6(A) is a schematic diagram of a precoding matrix for single-layer transmission by using two antenna ports according to an embodiment of this application;

FIG. 6(B) is a schematic diagram of a precoding matrix for two-layer transmission by using two antenna ports according to an embodiment of this application;

FIG. 7 is a schematic diagram of precoding information of four antenna ports and a quantity of layers according to an embodiment of this application;

FIG. 8(A) is a schematic diagram of a precoding matrix for single-layer transmission by using four antenna ports according to an embodiment of this application;

FIG. 8(B) is a schematic diagram of a precoding matrix for two-layer transmission by using four antenna ports according to an embodiment of this application;

FIG. 8(C) is a schematic diagram of a precoding matrix for three-layer transmission by using four antenna ports according to an embodiment of this application;

FIG. 8(D) is a schematic diagram of a precoding matrix for four-layer transmission by using four antenna ports according to an embodiment of this application;

FIG. 9 is a schematic diagram of non-codebook-based uplink transmission according to an embodiment of this application;

DESCRIPTION OF EMBODIMENTS

The following describes the embodiments of this application with reference to the accompanying drawings in the embodiments of this application.

Figure 1:
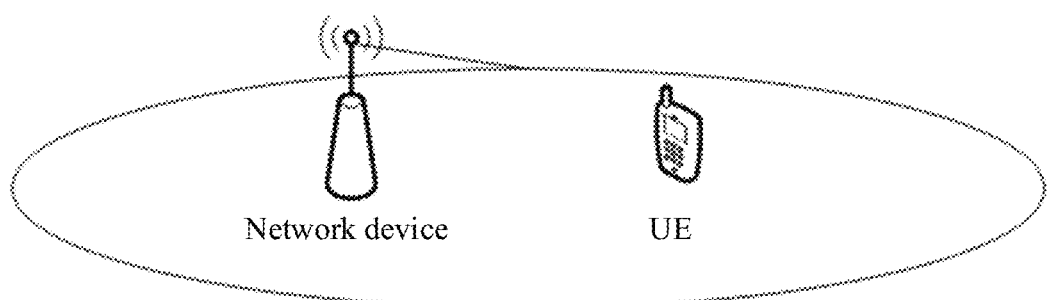
FIG. 1 is a schematic structural diagram of a power allocation system according to an embodiment of this application.

FIG. 1 is a schematic structural diagram of a power allocation system according to an embodiment of this application. The power allocation system includes a terminal device and a network device. The terminal device may refer to a device that provides a voice and/or data connection to a user, or may be connected to a computing device such as a laptop computer or a desktop computer, or may be an independent device such as a personal digital assistant (PDA). The terminal device may alternatively be a station (STA), a system, a subscriber unit, a subscriber station, a mobile station, a mobile console, a remote station, an access point, a remote terminal, an access terminal, a user terminal, a user agent, or a user apparatus. The network device may be a base station, a NodeB, an evolved Node (eNB), or a 5G next generation NodeB (gNB), and is a device in an access network that communicates with a wireless terminal over an air interface by using one or more sectors. By converting a received air interface frame into an IP packet, the network device may serve as a router between the wireless terminal and another part in the access network, and the access network may include an internet protocol network. The network device may further coordinate attribute management of the air interface.

The following explains terms used in this application.

Transport block (TB): Data sent from a medium access control (MAC) layer to a physical layer is the TB. One TB corresponds to one data block, and the data block is sent within one transmission time interval (TTI), and is also a unit of hybrid automatic repeat request (HARD) retransmission. If UE does not support spatial multiplexing, a maximum of one TB is sent in one TTI. If UE supports spatial multiplexing, a maximum of two TBs can be sent in one TTI.

It should be noted that, according to the protocol, the UE sends a maximum of two TBs in one TTI. For UE, during downlink transmission (non-carrier aggregation), an eNB sends a maximum of two TBs to the UE in one TTI, and during uplink transmission, the UE sends a maximum of two TBs to the eNB in one TTI. However, for an eNB, a plurality of UEs may be scheduled in one TTI. Therefore, the eNB may simultaneously send or receive more than two TBs in one TTI. Under carrier aggregation, the UE may simultaneously receive data from a plurality of carriers, or may send data on a plurality of carriers. Therefore, the UE may send or receive more than two TBs in one TTI. The UE may send or receive a maximum of two TBs in one TTI on a carrier.

Codeword: The codeword may be considered as a TB with error protection. The codeword is a data bitstream obtained by performing processing such as cyclic redundancy check (CRC) insertion, code block segmentation, channel coding, or rate matching, on a TB sent in a TTI. Each codeword corresponds to one TB. Therefore, UE sends a maximum of two codewords in one TTI.

Transport layer: Layer mapping is performed on a modulation symbol obtained after scrambling and modulation are performed on one or two CWs, and the modulation symbol is mapped to a maximum of four transport layers. Each transport layer corresponds to a valid data stream. A quantity of transport layers, that is, a quantity of layers, is referred to as a transmission order or a transmission rank, where the transmission rank may dynamically change. The mapping from one codeword to one or more transport layers may be considered as a process in which a codeword is equally divided into N parts and each part is placed at a transport layer. N herein is equal to a quantity of layers to which one codeword needs to be mapped.

Precoding: A full name is a precoding vector or a precoding matrix, and a process of precoding is mapping a transport layer to an antenna port by using the precoding matrix. A precoding matrix is an R×P matrix, where R is a transmission rank, and P is a quantity of antenna ports. Detailed descriptions are provided below.

Figure 2:
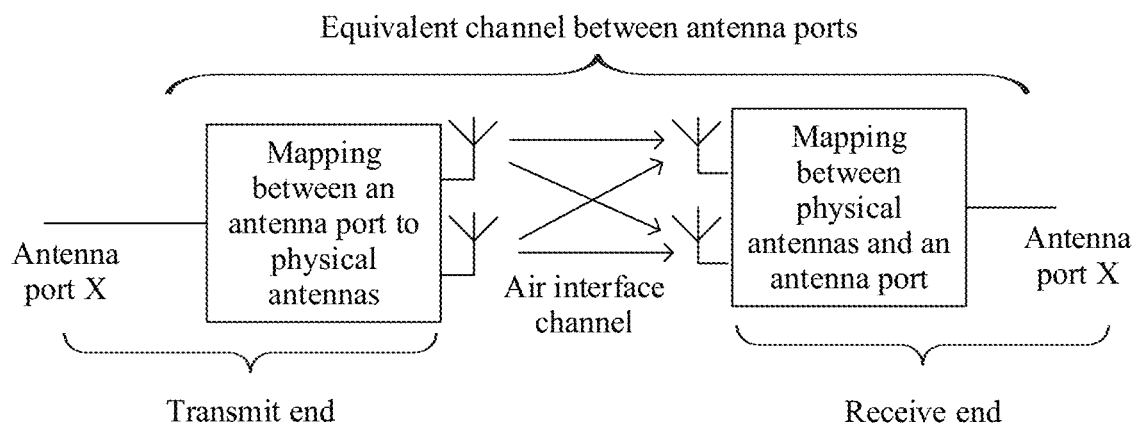
FIG. 2 is a schematic diagram of an equivalent channel between antenna ports according to an embodiment of this application.

Antenna port: The antenna port is a logical concept. One antenna port may be one physical transmit antenna, or may be a combination of a plurality of physical transmit antennas. In the second case, there is a level of precoding between one antenna port and a plurality of physical antennas. However, UE cannot distinguish between the two cases, and a receiver of the UE cannot decompose a signal from a same antenna port. FIG. 2 is a schematic diagram of an equivalent channel between antenna ports according to an embodiment of this application. From a perspective of the UE, only mapping of an antenna port at a transmit end to physical antennas, an air interface channel between the transmit end to physical antennas at a receive end, and mapping of the physical antennas at the receive end to an antenna port need to be considered as an equivalent channel. In addition, each antenna port corresponds to one reference signal (RS), and the UE may determine channel estimation of the antenna port based on the RS, to demodulate data transmitted on the antenna port. Each antenna port corresponds to a group of resource elements (RE), and is used to transmit an RS.

Figure 3:
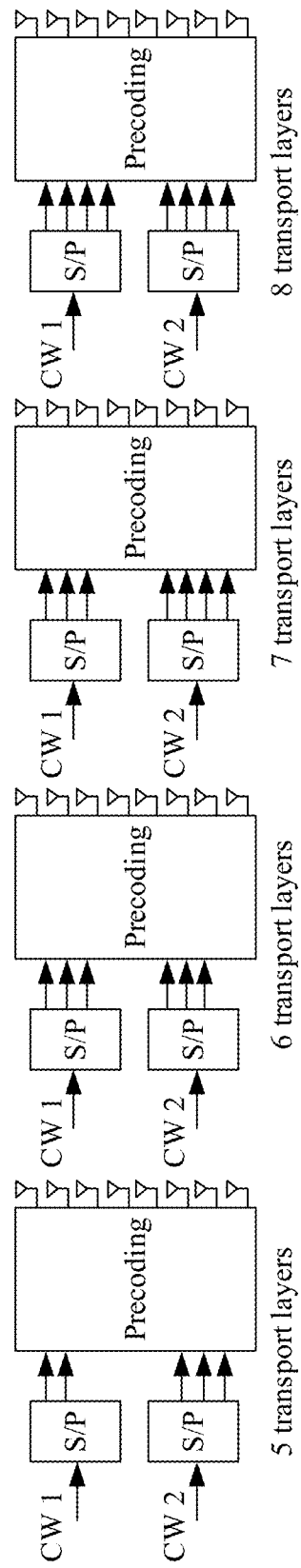
FIG. 3 is a schematic diagram of a mapping relationship according to an embodiment of this application.

FIG. 3 is a schematic diagram of a mapping relationship according to an embodiment of this application. First, a codeword or a TB is divided into a CW 1 and a CW 2. Then, the CW 1 and the CW 2 are respectively mapped to five transport layers, six transport layers, seven transport layers, or eight transport layers. Finally, the codeword at the transport layer is mapped to an antenna port through precoding. A relationship among a TB, a codeword, a transport layer, and an antenna port is: a quantity of TBs=a quantity of codewords≤a quantity of transport layers≤a quantity of antenna ports.

In this embodiment of this application, both an LTE system and an NR system support uplink spatial multiplexing. To be specific, a plurality of CWs or a single CW sent by UE is transmitted at a plurality of transport layers. To implement the uplink spatial multiplexing, a gNB needs to obtain an uplink channel of the UE, to allocate precoding to the UE. For example, NR supports two uplink transmission schemes, including codebook-based uplink transmission and non-codebook-based uplink transmission. The following describes the two uplink transmission schemes in detail.

Figure 4:
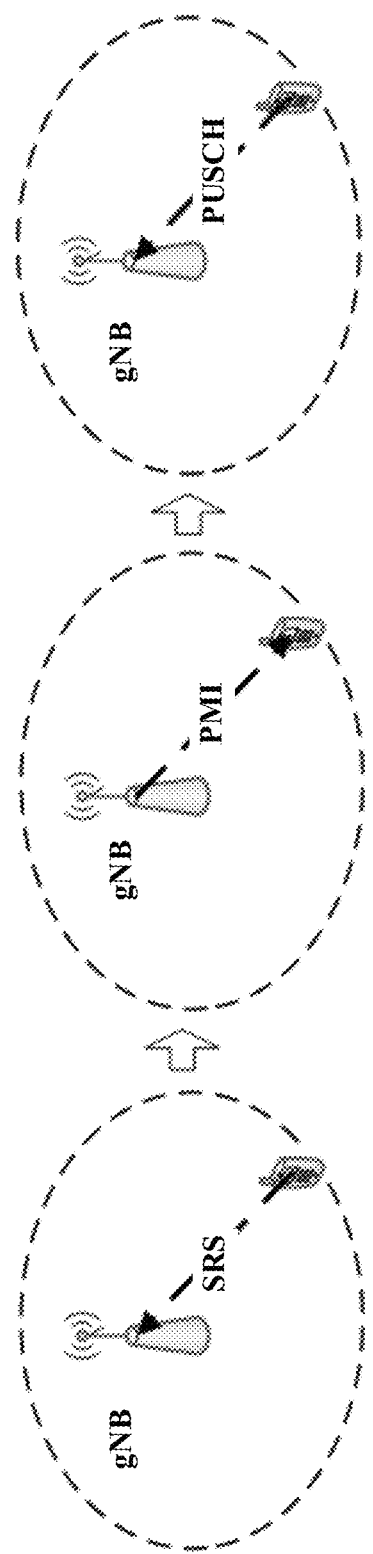
FIG. 4 is a schematic diagram of codebook-based uplink transmission according to an embodiment of this application.

FIG. 4 is a schematic diagram of codebook-based uplink transmission according to an embodiment of this application. The following operations are included: First, the UE sends an omnidirectional sounding reference signal (SRS) signal to the gNB. Then, after receiving the SRS, the gNB estimates an uplink channel of the UE based on the SRS, and sends downlink control information (DCI) to the UE. The DCI includes a precoding matrix indicator (PMI), and the PMI is used to indicate a quantity of CWs, a quantity of transport layers, and precoding that are used by the UE. Finally, the UE receives the PMI sent by the gNB, and performs uplink transmission based on the PMI. In an entire transmission process, to limit sizes of uplink signaling and downlink signaling, only a precoding matrix of a limited set is defined for each transmission rank, where the set is also referred to as a codebook. In codebook-based precoding, the gNB selects a precoding matrix, and notifies the UE of an index of the precoding matrix. The UE determines a corresponding precoding matrix based on the index, and then transmits a physical uplink shared channel (PUSCH) based on the precoding matrix. Detailed description is as follows:

For UE having two transmit ports, as shown in FIG. 5, FIG. 5 is a schematic diagram of precoding information of two antenna ports and a quantity of layers according to an embodiment of this application, including a bit field mapped to index, a quantity of transport layers, and a number of a precoding matrix. FIG. 6(A) is a schematic diagram of a precoding matrix for single-layer transmission by using two antenna ports according to an embodiment of this application, including precoding matrices respectively corresponding to a TPMI 0 to a TPMI 5 when the single-layer transmission is performed by using the two antenna ports. FIG. 6(B) is a schematic diagram of a precoding matrix for two-layer transmission by using two antenna ports according to an embodiment of this application, including precoding matrices respectively corresponding to a TPMI 0 to a TPMI 2 when the two-layer transmission is performed by using the two antenna ports. For example, in FIG. 5, the bit field mapped to index 1 corresponds to 1 layer and TPMI=1, it indicates that transmission is performed through one transport layer, and a number of a precoding matrix is 1. Therefore, a precoding matrix corresponding to TPMI=1 may be searched for in FIG. 6(A). For another example, in FIG. 5, the bit field mapped to index 7 corresponds to 2 layers and TPMI=1, it indicates that transmission is performed through two transport layers, and a number of a precoding matrix is 1. Therefore, a precoding matrix corresponding to TPMI=1 may be searched for in FIG. 6(B).

For UE having four transmit ports, as shown in FIG. 7, FIG. 7 is a schematic diagram of precoding information of four antenna ports and a quantity of layers according to an embodiment of this application, including a bit field mapped to index, a quantity of transport layers, and a number of a precoding matrix. FIG. 8(A) is a schematic diagram of a precoding matrix for single-layer transmission by using four antenna ports according to an embodiment of this application, including precoding matrices respectively corresponding to a TPMI 0 to a TPMI 27 when the single-layer transmission is performed by using the four antenna ports. FIG. 8(B) is a schematic diagram of a precoding matrix for two-layer transmission by using four antenna ports according to an embodiment of this application, including precoding matrices respectively corresponding to a TPMI 0 to a TPMI 21 when the two-layer transmission is performed by using the four antenna ports. FIG. 8(C) is a schematic diagram of a precoding matrix for three-layer transmission by using four antenna ports according to an embodiment of this application, including precoding matrices respectively corresponding to a TPMI 0 to a TPMI 6 when the three-layer transmission is performed by using the four antenna ports. FIG. 8(D) is a schematic diagram of a precoding matrix for four-layer transmission by using four antenna ports according to an embodiment of this application, including precoding matrices respectively corresponding to a TPMI 0 to a TPMI 4 when the four-layer transmission is performed by using the four antenna ports. For example, in FIG. 7, the bit field mapped to index 0 corresponds to 1 layer and TPMI=0, it indicates that transmission is performed through one transport layer, and a number of a precoding matrix is 0. Therefore, a precoding matrix corresponding to TPMI=0 may be searched for in FIG. 8(A). For another example, in FIG. 7, the bit field mapped to index 10 corresponds to 3 layers and TPMI=0, it indicates that transmission is performed through three transport layers, and a number of a precoding matrix is 0. Therefore, a precoding matrix corresponding to TPMI=0 may be searched for in FIG. 8(C). Examples are not provided for description herein one by one.

In conclusion, each matrix or vector in the foregoing codebook may be referred to as precoding. Each row of the precoding corresponds to one antenna port, and each column corresponds to one transport layer. Therefore, a quantity of rows of the precoding is the same as a quantity of antenna ports. The foregoing precoding may be classified into three types: non-coherent precoding, partial coherent precoding, and full coherent precoding. In data transmission corresponding to non-coherent precoding, only one antenna port is used by each transport layer. For example, in a precoding matrix $$\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix},$$

there is only one non-zero element in each column, indicating that one antenna port is used by each transport layer. Therefore, the precoding matrix is non-coherent precoding. The partial coherent precoding is a precoding matrix in which more than one antenna port but not all antenna ports are used by at least one transport layer. For example, in a precoding matrix $$\frac{1}{2\sqrt{2}}\begin{bmatrix} 1 & 1 & 0 & 0 \\ 0 & 0 & 1 & 1 \\ 1 & -1 & 0 & 0 \\ 0 & 0 & 1 & -1 \end{bmatrix},$$

there are two non-zero elements in each column, indicating that two antenna ports are used by each transport layer. Therefore, the precoding matrix is partial coherent precoding. The full coherent precoding is a precoding matrix in which all antenna ports are used by each transport layer. For example, in a precoding matrix $$\frac{1}{4}\begin{bmatrix} 1 & 1 & 1 & 1 \\ 1 & -1 & 1 & -1 \\ j & j & -j & -j \\ j & -j & -j & j \end{bmatrix},$$

there are four non-zero elements in each column, indicating that four antenna ports are used by each transport layer. Therefore, the precoding matrix is full coherent precoding.

FIG. 9 is a schematic diagram of non-codebook-based uplink transmission according to an embodiment of this application. The following operations are included: First, the gNB sends a downlink reference signal, for example, a channel state information reference signal (CSI-RS), to the UE. Then, the UE estimates an uplink channel based on the downlink reference signal, where the downlink reference signal and uplink transmission are in a same frequency band, and sends a directional SRS, that is, an SRS with precoding, to the gNB based on the estimated uplink channel. Then, the gNB sends DCI to the UE, where the DCI includes an SRI, and the SRI is used to indicate a quantity of CWs, a quantity of transport layers, and precoding that are used by the UE. In this operation, compared with that in the codebook-based uplink transmission scheme, a difference lies in that the gNB does not know specific information about precoding used by the UE, but only determines precoding performance based on energy of the received SRS, to schedule the UE to use precoding with relatively good performance. Finally, the UE performs uplink transmission based on indication information of the SRI.

For example, in the LTE system, an eNB indicates, by using a DCI format 4, parameters, namely, a quantity of CWs, a quantity of transport layers, and a precoding matrix, related to spatial multiplexing used by the UE for uplink transmission of a PUSCH. In addition, the DCI format 4 further includes a transmit power control (TPC) field, used to indicate an adjustment value of a transmit power for transmitting a PUSCH by the UE compared with a transmit power for transmitting the PUSCH last time. For example, if an indication is +1 dB, it indicates that the transmit power for transmitting the PUSCH this time is 1 dB greater than the transmit power for transmitting the PUSCH last time. The TPC is further used to indicate all CWs and all transport layers for the PUSCH. However, a total transmit power of the UE is limited (which is generally approximately 23 dBm). Therefore, the eNB cannot increase the transmit power of the UE to an unlimited extent. Therefore, the UE needs to approximately periodically report a transmit power headroom PH while transmitting the PUSCH. When the transmit power of the UE does not reach a maximum transmit power of the UE, the eNB may consider increasing the transmit power of the UE, which is generally embodied as increasing a transmit bandwidth or increasing a transmit power spectral density through TPC. However, the transmit power of the UE is limited (which is generally approximately 23 dBm). Therefore, the eNB cannot increase the transmit power of the UE to an unlimited extent. Therefore, the UE needs to approximately periodically report a power headroom response (PHR) of the UE while transmitting the PUSCH. When the transmit power of the UE does not reach a maximum transmit power of the UE, the eNB may consider increasing the transmit power of the UE, for example, increasing a transmit bandwidth or increasing a transmit power spectral density through TPC.

In conclusion, in an existing LTE uplink system and an existing NR uplink system, because a network device cannot obtain sufficiently accurate uplink channel information, inter-layer power allocation is not supported. If the gNB schedules and transmits a plurality of transport layers, the UE considers by default that a same transmit power is used for all transport layers for sending uplink data. Therefore, a transmission rate of a system cannot be maximized, and a transmission rate of the system is not high. For the foregoing technical problem, this application provides the following technical solutions.

Figure 10:
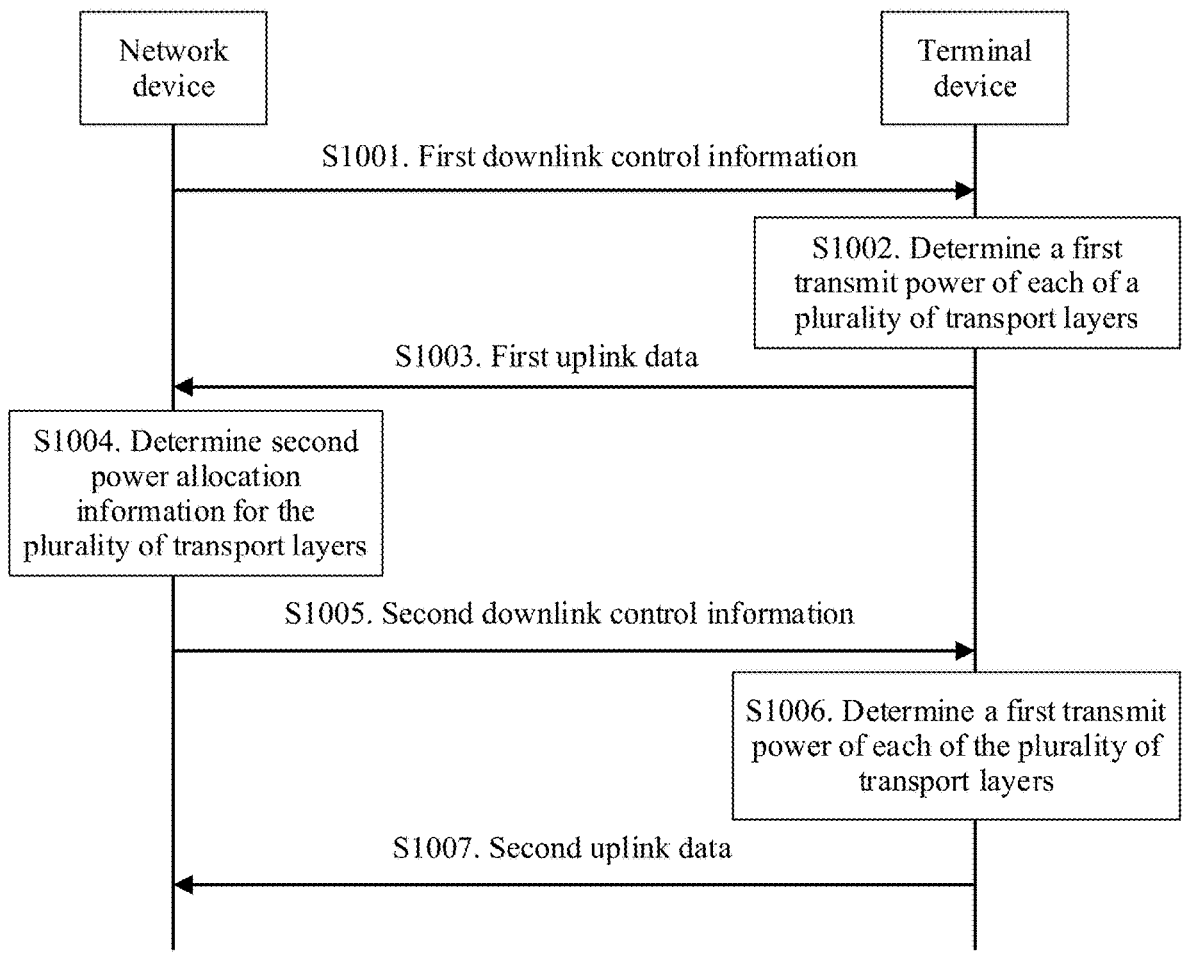
FIG. 10 is a schematic flowchart of a power allocation method according to an embodiment of this application.

FIG. 10 is a schematic flowchart of a power allocation method according to an embodiment of this application. As shown in the figure, in this embodiment of this application, a terminal device is configured to report inter-layer power allocation capability information supported by a plurality of transport layers. The method in this embodiment of this application includes at least the following operations.

S1001. A network device sends first downlink control information to the terminal device. The first downlink control information may be an uplink scheduling grant (UL grant). The first downlink control information includes first power allocation information for the plurality of transport layers.

In this embodiment of this application, because the terminal device is configured to report the inter-layer power allocation capability information supported by the plurality of transport layers, this embodiment of this application is applicable to non-codebook-based uplink transmission. In some scenarios, a time-varying characteristic of a channel is extremely slow, and the network device may estimate an uplink channel based on a combination of SRSs sent by the terminal device for a plurality of times, to obtain accurate uplink channel information, so that the power allocation information for the transport layers can be introduced into the downlink control information.

In addition, the network device may configure the power allocation information for the transport layers, for example, allocate a same transmit power to a plurality of transport layers that belong to a same codeword, and allocate different transmit powers to transport layers that belong to different codewords, thereby implementing power allocation for a plurality of codewords. It should be understood that the inter-codeword power allocation is a subset of the transport layer power allocation. In this embodiment of this application, the inter-codeword power allocation may be used as a specific implementation for all solutions for the transport layer power allocation.

S1002. The terminal device determines a first transmit power of each of the plurality of transport layers based on the first power allocation information.

During specific implementation, because the network device does not receive the inter-layer power allocation capability information reported by the terminal device, the network device may identify the first power allocation information as a default state 0. After receiving the first power allocation information, the terminal device allocates the transmit power of each transport layer based on the default state 0. Therefore, it is ensured that the terminal device performs an operation based on the DCI sent by the network device. In addition, after receiving the first downlink control information, the terminal device may determine inter-layer power allocation capability information supported by each transport layer, and report the inter-layer power allocation capability information supported by each transport layer to the network device, so that the network device determines second power allocation information for the plurality of transport layers of the terminal device. The following several optional manners are included.

In a first optional manner, the first downlink control information includes a precoding matrix indicator PMI or a spatial rank index (SRI), and the terminal device may determine, based on the PMI or the SRI, precoding used by the plurality of transport layers, a quantity of CWs, and a quantity of the transport layers. Further, an antenna port used by each transport layer is determined based on the precoding used by the plurality of transport layers, a maximum transmit power parameter of the antenna port of the terminal device is then obtained, and finally, the inter-layer power allocation capability information supported by each transport layer is determined based on the maximum transmit power parameter.

In a second optional manner, the first downlink control information further includes codeword-transport layer-precoding (CW-layer-precoding) correspondence indication information, and the plurality of transport layers include at least two groups of transport layers. The terminal device may determine, based on the correspondence indication information, antenna ports used by the at least two groups of transport layers, and then determine, based on the antenna ports used by the at least two groups of transport layers, the inter-layer power allocation capability information supported by each transport layer.

In a third optional manner, the inter-layer power allocation capability information may be determined based on the antenna ports used by the at least two groups of transport layers and a maximum transmit power parameter of the antenna port.

It should be noted that the inter-layer power allocation capability information of the terminal device is related to the correspondence indication information. For example, if UE needs to send a CW 0 and a CW 1, in a precoding matrix $$\frac{1}{2\sqrt{2}}\begin{bmatrix} 1 & 1 & 0 & 0 \\ 0 & 0 & 1 & 1 \\ 1 & -1 & 0 & 0 \\ 0 & 0 & 1 & -1 \end{bmatrix},$$

in a conventional LTE or NR system, it is considered by default that the first two columns are used to transmit the CW 0, and the last two columns are used to send the CW 1. There are two non-zero elements in the first two columns of the precoding, indicating that the CW 0 is sent through an antenna port 1 and an antenna port 3, and there are also two non-zero elements in the last two columns of the precoding, indicating that the CW 1 is sent through an antenna port 2 and an antenna port 4. Uplink data is transmitted through different antenna ports by using the CW 0 and the CW 1. Therefore, the inter-layer power allocation capability information supported by the UE is limited by an antenna hardware parameter. However, if the correspondence indication information indicates to allocate the first column and the third column of the precoding matrix to the CW 0, and allocate the second column and the fourth column of the precoding matrix to the CW 1, the first column and the third column indicate that a transport layer 1 and a transport layer 3 are grouped into a group of transport layers, and the CW 0 is sent through the antenna port 1 to the antenna port 4; and the second column and the fourth column indicate that a transport layer 2 and a transport layer 4 are grouped into another group of transport layers, and the CW 1 is sent through the antenna port 1 to the antenna port 4. Uplink data is transmitted through same antenna ports by using the CW 0 and the CW 1. Therefore, the power may be allocated in any proportion without being affected by the antenna hardware parameter.

Further, when the precoding used by the plurality of transport layers is full coherent precoding or partial coherent precoding, and the antenna ports used by the at least two groups of transport layers are the same, the power may be allocated in any proportion because the same antenna ports are used by different CWs for sending the uplink data, and the inter-layer power allocation capability information does not need to be reported. However, when the precoding used by the plurality of transport layers is non-coherent precoding, or the precoding used by the plurality of transport layers is partial coherent precoding and the antenna ports used by the at least two groups of transport layers are different, the terminal device needs to determine the inter-layer power allocation capability information supported by each transport layer, and report the inter-layer power allocation capability information supported by each transport layer to the network device. For example, when receiving a precoding matrix x indicated by the PMI sent by the network device, the terminal device determines that the precoding matrix x is non-coherent precoding, and therefore reports, to the network device, inter-layer power allocation capability information corresponding to the precoding matrix x, so that the network device reallocates power allocation information corresponding to the precoding matrix x.

S1003. The terminal device sends first uplink data to the network device based on the first transmit power of each transport layer. The first uplink data includes the inter-layer power allocation capability information.

During specific implementation, the terminal device may send the inter-layer power allocation capability information to the network device by using higher layer signaling, for example, a MAC CE, to reduce physical layer signaling overheads and improve information transmission reliability. The inter-layer power allocation capability information may be carried on a PUSCH scheduled by the UL grant and sent to the network device, so that information transmission reliability is ensured, and a delay of information transmission can be reduced.

S1004. The network device determines second power allocation information for the plurality of transport layers based on the inter-layer power allocation capability information.

S1005. The network device sends second downlink control information to the terminal device. The second downlink control information includes a PMI or an SRI, and the second power allocation information for the plurality of transport layers. The PMI or the SRI in the first downlink control information is the same as the PMI or the SRI in the second downlink control information.

S1006. The terminal device determines a second transmit power of each of the plurality of transport layers based on the second power allocation information.

S1007. The terminal device sends second uplink data to the network device based on the second transmit power of each transport layer.

In this embodiment of this application, the terminal device is configured to report the inter-layer power allocation capability information supported by the plurality of transport layers. When receiving the first downlink control information sent by the network device, the terminal device determines the inter-layer power allocation capability information supported by each transport layer, and returns the inter-layer power allocation capability information to the network device. The network device reallocates the power allocation information for the plurality of transport layers based on the inter-layer power allocation capability information, and sends the power allocation information to the terminal device, so that the terminal device sends the uplink data based on the allocated power allocation information. Different transmit powers are allocated to different transport layers based on the power allocation information, thereby improving transmission efficiency of the system.

Figure 11:
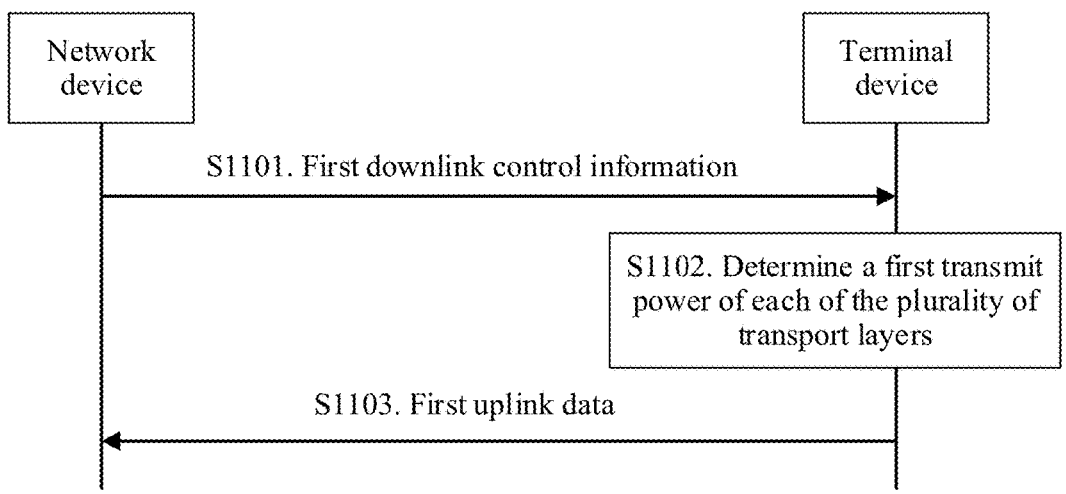
FIG. 11 is a schematic flowchart of another power allocation method according to an embodiment of this application.

FIG. 11 is a schematic flowchart of another power allocation method according to an embodiment of this application. As shown in the figure, in this embodiment of this application, a terminal device is not configured to report inter-layer power allocation capability information supported by a plurality of transport layers. The method in this embodiment of this application includes at least the following operations.

S1101. A network device sends first downlink control information to the terminal device, where the first downlink control information may be an uplink scheduling grant (UL grant), and the first downlink control information includes first power allocation information for a plurality of transport layers.

In this embodiment of this application, because the terminal device is not configured to report the inter-layer power allocation capability information supported by the plurality of transport layers, this embodiment of this application is applicable to codebook-based uplink transmission. That the network device sends a PMI indicates that the network device knows precoding that is allocated to the terminal device and that is used for uplink transmission, and that the network device sends an SRI indicates that the network device does not know precoding that is used by the terminal device and that is used for uplink transmission. Therefore, in a scenario in which the terminal device does not feed back the inter-layer power allocation capability information, the UL grant includes the PMI but does not include the SRI, and only the PMI may support inter-layer power allocation.

Optionally, the network device enables the inter-layer power allocation for the terminal device by using higher layer signaling.

S1102. The terminal device determines a first transmit power of each of the plurality of transport layers based on the first power allocation information.

During specific implementation, the first downlink control information includes a precoding matrix indicator PMI, and the terminal device determines, based on the PMI, precoding used by the plurality of transport layers. When the precoding used by the plurality of transport layers is full coherent precoding or the inter-layer power allocation is enabled, the terminal device supports the inter-layer power allocation, and may determine the first transmit power of each of the plurality of transport layers based on the first power allocation information.

For example, in a precoding matrix $$\frac{1}{4}\begin{bmatrix} 1 & 1 & 1 & 1 \\ 1 & -1 & 1 & -1 \\ 1 & 1 & -1 & -1 \\ 1 & -1 & -1 & 1 \end{bmatrix},$$

there are four non-zero elements in each column, indicating that four antenna ports are used by each transport layer for sending uplink data. Therefore, power may be allocated in any proportion without being affected by an antenna hardware parameter. However, in a precoding matrix $$\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix},$$

there is one non-zero element in each column, indicating that only one antenna port is used by each transport layer for sending the uplink data. Because hardware parameters of antenna ports are different, when UE does not feed back the inter-layer power allocation capability information, and even if DCI sent by an eNB includes power allocation information, the UE does not support the inter-layer power allocation.

Optionally, the first downlink control information includes a precoding matrix indicator PMI and codeword-transport layer-precoding correspondence indication information, and the plurality of transport layers include at least two groups of transport layers. The terminal device determines, based on the PMI, precoding used by the plurality of transport layers, and determines, based on the correspondence indication information, antenna ports used by the at least two groups of transport layers; and when the precoding used by the plurality of transport layers is partial coherent precoding, and the antenna ports used by the at least two groups of transport layers are the same, the terminal device supports inter-layer power allocation, and may determine the first transmit power of each of the plurality of transport layers based on the first power allocation information.

It should be noted that the inter-layer power allocation capability information of the terminal device is related to the correspondence indication information. For example, if UE needs to send a CW 0 and a CW 1, in a precoding matrix $$\frac{1}{2\sqrt{2}}\begin{bmatrix} 1 & 1 & 0 & 0 \\ 0 & 0 & 1 & 1 \\ 1 & -1 & 0 & 0 \\ 0 & 0 & 1 & -1 \end{bmatrix},$$

in a conventional LTE or NR system, it is considered by default that the first two columns are used to transmit the CW 0, and the last two columns are used to send the CW 1. There are two non-zero elements in the first two columns of the precoding, indicating that the CW 0 is sent through an antenna port 1 and an antenna port 3, and there are also two non-zero elements in the last two columns of the precoding, indicating that the CW 1 is sent through an antenna port 2 and an antenna port 4. Uplink data is transmitted through different antenna ports by using the CW 0 and the CW 1. Therefore, the inter-layer power allocation capability information supported by the UE is limited by an antenna hardware parameter. However, if the correspondence indication information indicates to allocate the first column and the third column of the precoding matrix to the CW 0, and allocate the second column and the fourth column of the precoding matrix to the CW 1, the first column and the third column indicate that a transport layer 1 and a transport layer 3 are grouped into a group of transport layers, and the CW 0 is sent through the antenna port 1 to the antenna port 4; and the second column and the fourth column indicate that a transport layer 2 and a transport layer 4 are grouped into another group of transport layers, and the CW 1 is sent through the antenna port 1 to the antenna port 4. Uplink data is transmitted through same antenna ports by using the CW 0 and the CW 1. Therefore, the power may be allocated in any proportion without being affected by the antenna hardware parameter.

S1103. The terminal device sends first uplink data to the network device based on the first transmit power of each transport layer.

Optionally, if the terminal device does not support the inter-layer power allocation, for example, the precoding is non-coherent precoding, or the precoding is partial coherent precoding and different antenna ports are used by the at least two groups of transport layers, the terminal device determines whether an error occurs during decoding of the first downlink control information, for example, whether the power allocation information is used as a virtual information check bit. Alternatively, the terminal device re-parses the power allocation information in the downlink control information. For example, a bit field is used as a TPC field, to indicate an adjustment value of a transmit power for transmitting a PUSCH by UE compared with a transmit power for transmitting the PUSCH last time.

In this embodiment of this application, the terminal device is not configured to report the inter-layer power allocation capability information supported by the plurality of transport layers, and the network device sends the first downlink control information to the terminal device, where the first downlink control information includes the first transmit power. After receiving the first downlink control information, the terminal device needs to determine whether the inter-layer power allocation is supported, and when the terminal device supports the inter-layer power allocation, the terminal sends the first uplink data to the network device based on the first transmit power of each transport layer, and allocates different transmit powers to different transport layers based on the power allocation information, thereby improving transmission efficiency of a system.

The foregoing describes in detail the methods in the embodiments of this application. The following provides apparatuses in the embodiments of this application.

Figure 12:
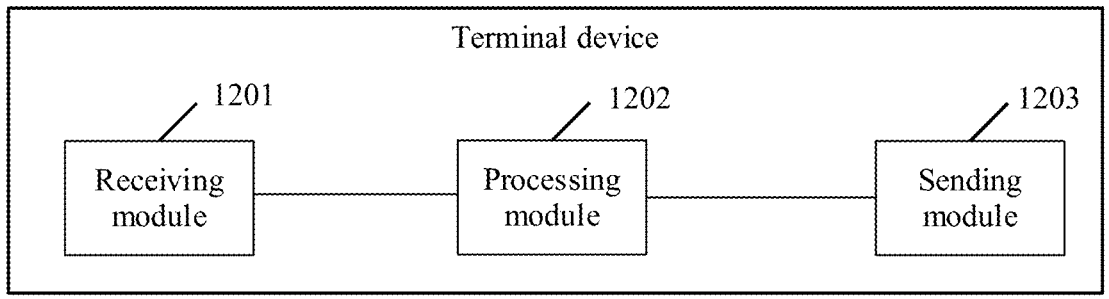
FIG. 12 is a schematic structural diagram of a terminal device according to an embodiment of this application.

FIG. 12 is a schematic structural diagram of a terminal device according to an embodiment of this application. The terminal device may include a receiving module 1201, a processing module 1202, and a sending module 1203. Detailed descriptions of the modules are as follows:

The receiving module 1201 is configured to receive first downlink control information sent by a network device, where the first downlink control information includes first power allocation information for a plurality of transport layers.

The processing module 1202 is configured to determine a first transmit power of each of the plurality of transport layers based on the first power allocation information.

The sending module 1203 is configured to send first uplink data based on the first transmit power of each transport layer.

The first downlink control information includes a precoding matrix indicator PMI.

The processing module 1202 is further configured to: determine, based on the PMI, precoding used by the plurality of transport layers; and when the precoding used by the plurality of transport layers is full coherent precoding, determine the first transmit power of each transport layer based on the first power allocation information.

Optionally, the first downlink control information includes a precoding matrix indicator PMI and codeword-transport layer-precoding correspondence indication information, and the plurality of transport layers include at least two groups of transport layers.

The processing module 1202 is further configured to: determine, based on the PMI, precoding used by the plurality of transport layers; determine, based on the correspondence indication information, antenna ports used by the at least two groups of transport layers; and when the precoding used by the plurality of transport layers is partial coherent precoding, and the antenna ports used by the at least two groups of transport layers are the same, determine the first transmit power of each transport layer based on the first power allocation information.

Optionally, the processing module 1202 is further configured to determine inter-layer power allocation capability information supported by each transport layer, where the first uplink data includes the inter-layer power allocation capability information, and the inter-layer power allocation capability information is used to indicate second power allocation information for the plurality of transport layers.

Optionally, the first downlink control information includes a precoding matrix indicator PMI or a spatial rank index SRI, and codeword-transport layer-precoding correspondence indication information, and the plurality of transport layers include at least two groups of transport layers.

The processing module 1202 is further configured to: determine, based on the PMI or the SRI, precoding used by the plurality of transport layers; determine, based on the correspondence indication information, antenna ports used by the at least two groups of transport layers; and when the precoding used by the plurality of transport layers is non-coherent precoding, or the precoding used by the plurality of transport layers is partial coherent precoding and the antenna ports used by the at least two groups of transport layers are different, determine the inter-layer power allocation capability information supported by each transport layer.

The processing module 1202 is further configured to determine the inter-layer power allocation capability information based on at least one of the antenna ports used by the at least two groups of transport layers and a maximum transmit power parameter of the antenna port.

Optionally, the receiving module 1201 is further configured to receive second downlink control information sent by the network device, where the second downlink control information includes second power allocation information for the plurality of transport layers; the processing module 1202 is further configured to determine a second transmit power of each of the plurality of transport layers based on the second power allocation information; and the sending module 1203 is further configured to send second uplink data based on the second transmit power of each transport layer. The PMI or the SRI in the first downlink control information is the same as a PMI or an SRI in the second downlink control information.

The first power allocation information is identified as a default state 0.

It should be noted that, for implementation of the modules, refer to corresponding descriptions in the method embodiments shown in FIG. 10 and FIG. 11, to perform the methods and the functions performed by the terminal device in the foregoing embodiments.

Figure 13:
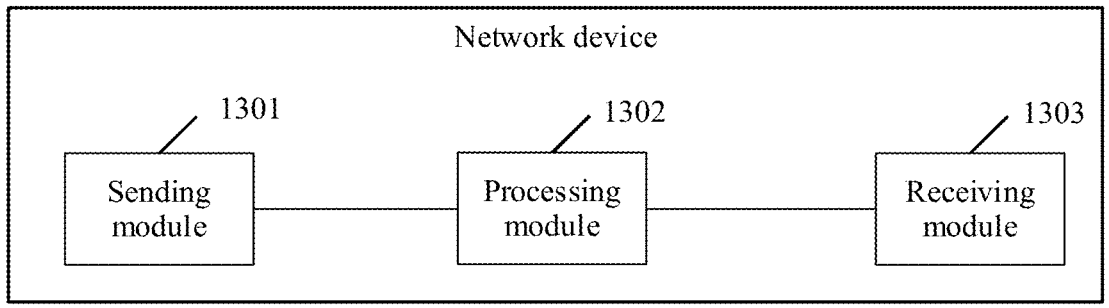
FIG. 13 is a schematic structural diagram of a network device according to an embodiment of this application.

FIG. 13 is a schematic structural diagram of a network device according to an embodiment of this application. The network device may include a sending module 1301, a processing module 1302, and a receiving module 1303. Detailed descriptions of the modules are as follows:

The sending module 1301 is configured to send first downlink control information to a terminal device, where the first downlink control information includes first power allocation information for a plurality of transport layers, and the first power allocation information is used to indicate the terminal device to determine a first transmit power of each of the plurality of transport layers and send first uplink data based on the first transmit power of each transport layer.

The receiving module 1303 is configured to receive the first uplink data sent by the terminal device.

Optionally, the processing module 1302 is configured to determine second power allocation information for the plurality of transport layers based on the inter-layer power allocation capability information; and the sending module 1301 is further configured to send second downlink control information to the terminal device, where the second downlink control information includes the second power allocation information for the plurality of transport layers, and the second power allocation information is used to indicate the terminal device to determine a second transmit power of each of the plurality of transport layers and send second uplink data to the network device based on the second transmit power of each transport layer. A PMI or an SRI in the first downlink control information is the same as a PMI or an SRI in the second downlink control information.

It should be noted that, for implementation of the modules, refer to corresponding descriptions in the method embodiments shown in FIG. 10 and FIG. 11, to perform the methods and the functions performed by the network device in the foregoing embodiments.

Figure 14:
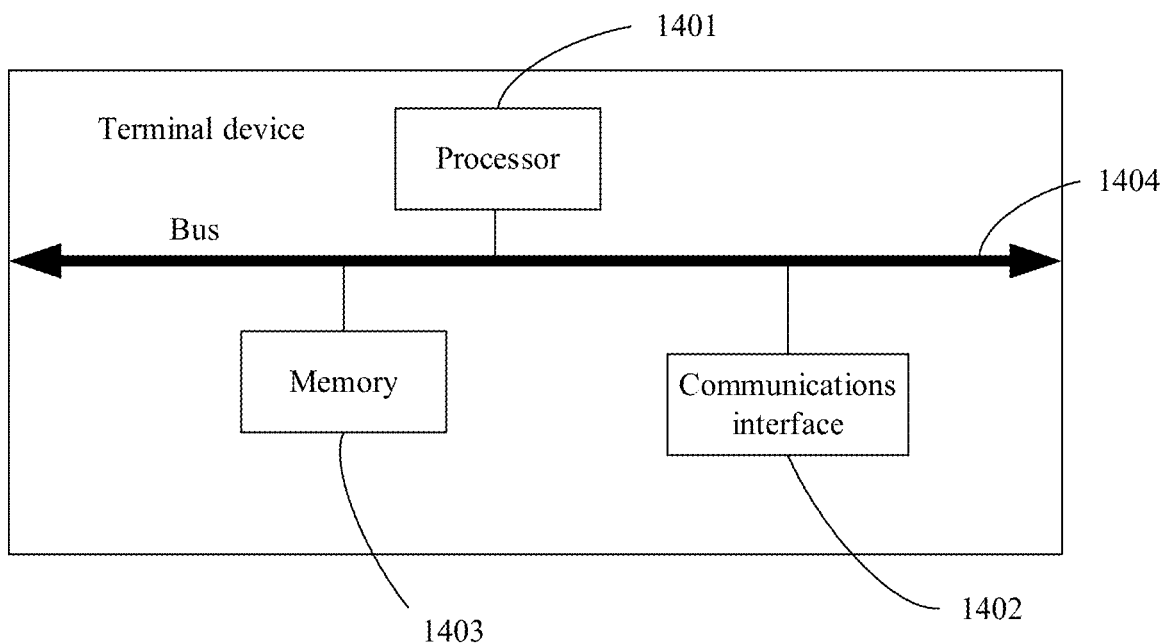
FIG. 14 is a schematic structural diagram of another terminal device according to an embodiment of this application.

FIG. 14 is a schematic structural diagram of another terminal device according to an embodiment of this application. As shown in the figure, the terminal device may include at least one processor 1401, at least one communications interface 1402, at least one memory 1403, and at least one communications bus 1404.

The processor 1401 may be a central processing unit, a general-purpose processor, a digital signal processor, an application-specific integrated circuit, a field programmable gate array or another programmable logic device, a transistor logic device, a hardware component, or any combination thereof. The processor 1401 may implement or execute various example logical blocks, modules, and circuits described with reference to content disclosed in this application. Alternatively, the processor may be a combination of processors implementing a computing function, for example, a combination of one or more microprocessors, or a combination of a digital signal processor and a microprocessor. The communications bus 1404 may be a peripheral component interconnect PCI bus, an extended industry standard architecture EISA bus, or the like. The bus may be classified into an address bus, a data bus, a control bus, and the like. For ease of representation, only one thick line is used to represent the bus in FIG. 14, but this does not mean that there is only one bus or only one type of bus. The communications bus 1404 is configured to implement connection and communication between these components. The communications interface 1402 in the device in this embodiment of this application is configured to perform signaling or data communication with another node device. The memory 1403 may include a volatile memory, for example, a nonvolatile dynamic random access memory (NVRAM), a phase change random access memory (PRAM), or a magnetoresistive random access memory (MRAM). The memory 1403 may further include a nonvolatile memory, for example, at least one magnetic disk storage device, an electrically erasable programmable read-only memory (EEPROM), a flash storage device, for example, a NOR flash memory or a NAND flash memory, or a semiconductor device, for example, a solid-state drive (Solid State Disk, SSD). Optionally, the memory 1403 may be at least one storage apparatus far away from the processor 1401. The memory 1403 stores a group of program code, and the processor 1401 executes a program that is in the memory 1403 and that is executed by the terminal device.

The terminal device receives first downlink control information sent by a network device, where the first downlink control information includes first power allocation information for a plurality of transport layers;

determines a first transmit power of each of the plurality of transport layers based on the first power allocation information; and sends first uplink data based on the first transmit power of each transport layer.

The first downlink control information includes a precoding matrix indicator PMI.

Optionally, the processor 1401 is further configured to perform the following operations:

the determining a first transmit power of each of the plurality of transport layers based on the first power allocation information includes:

determining, based on the PMI, precoding used by the plurality of transport layers; and when the precoding used by the plurality of transport layers is full coherent precoding, determining the first transmit power of each of the transport layers based on the first power allocation information.

The first downlink control information includes a precoding matrix indicator PMI and codeword-transport layer-precoding correspondence indication information, and the plurality of transport layers include at least two groups of transport layers.

Optionally, the processor 1401 is further configured to perform the following operations:

determining, based on the PMI, precoding used by the plurality of transport layers, and determining, based on the correspondence indication information, antenna ports used by the at least two groups of transport layers; and when the precoding used by the plurality of transport layers is partial coherent precoding, and the antenna ports used by the at least two groups of transport layers are the same, determining, by the terminal device, the first transmit power of each transport layer based on the first power allocation information.

Optionally, the processor 1401 is further configured to perform the following operations:

determining inter-layer power allocation capability information supported by each transport layer, where the first uplink data includes the inter-layer power allocation capability information, and the inter-layer power allocation capability information is used to indicate second power allocation information for the plurality of transport layers.

The first downlink control information includes a precoding matrix indicator PMI or a spatial rank index SRI, and codeword-transport layer-precoding correspondence indication information, and the plurality of transport layers include at least two groups of transport layers.

Optionally, the processor 1401 is further configured to perform the following operations:

determining, based on the PMI or the SRI, precoding used by the plurality of transport layers, and determining, based on the correspondence indication information, antenna ports used by the at least two groups of transport layers; and when the precoding used by the plurality of transport layers is non-coherent precoding, or the precoding used by the plurality of transport layers is partial coherent precoding and the antenna ports used by the at least two groups of transport layers are different, determining the inter-layer power allocation capability information supported by each transport layer.

Optionally, the processor 1401 is further configured to perform the following operations:

determining the inter-layer power allocation capability information based on at least one of the antenna ports used by the at least two groups of transport layers and a maximum transmit power parameter of the antenna port.

Optionally, the processor 1401 is further configured to perform the following operations:

receiving second downlink control information sent by the network device, where the second downlink control information includes the second power allocation information for the plurality of transport layers;

determining a second transmit power of each of the plurality of transport layers based on the second power allocation information; and sending second uplink data based on the second transmit power of each transport layer.

The PMI or the SRI in the first downlink control information is the same as a PMI or an SRI in the second downlink control information.

The first power allocation information is identified as a default state 0.

Further, the processor may further cooperate with the memory and the communications interface to perform operations of the terminal device in the foregoing embodiments of this application.

Figure 15:
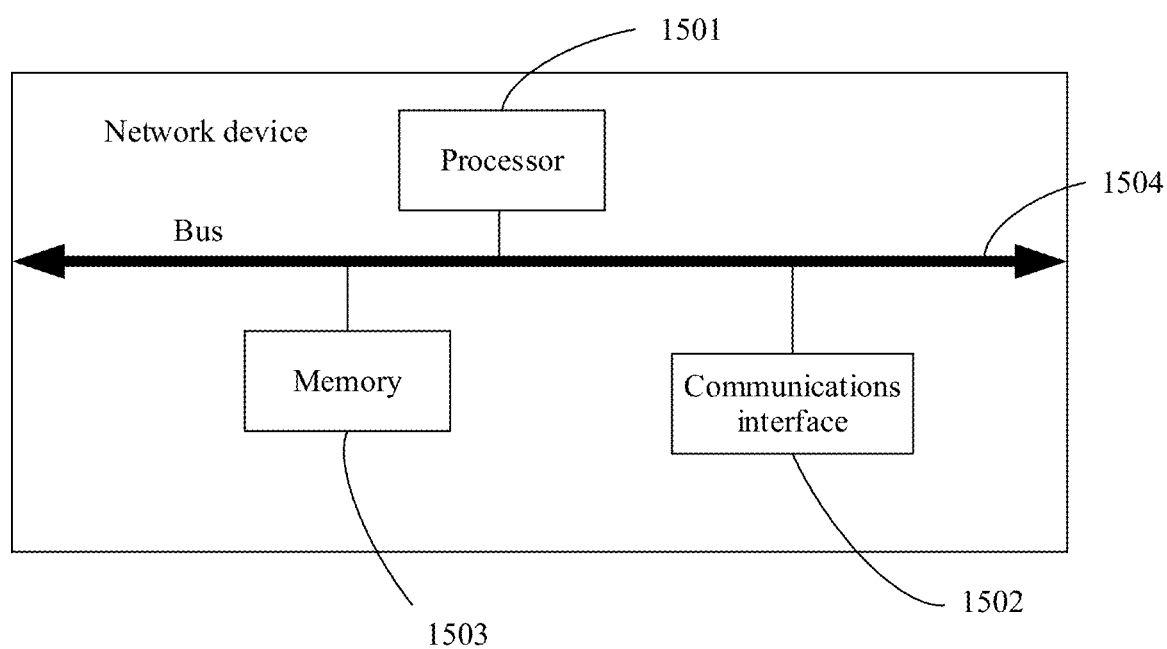
FIG. 15 is a schematic structural diagram of another network device according to an embodiment of this application.

FIG. 15 is a schematic structural diagram of another network device according to this application. As shown in the figure, the network device may include at least one processor 1501, at least one communications interface 1502, at least one memory 1503, and at least one communications bus 1504.

The processor 1501 may be processors of various types that are mentioned above. The communications bus 1504 may be a peripheral component interconnect PCI bus, an extended industry standard architecture EISA bus, or the like. The bus may be classified into an address bus, a data bus, a control bus, and the like. For ease of representation, only one thick line is used to represent the bus in FIG. 15, but this does not mean that there is only one bus or only one type of bus. The communications bus 1504 is configured to implement connection and communication between these components. The communications interface 1502 in the device in this embodiment of this application is configured to perform signaling or data communication with another node device. The memory 1503 may be memories of various types that are mentioned above. Optionally, the memory 1503 may be at least one storage apparatus far away from the processor 1501. The memory 1503 stores a group of program code, and the processor 1501 executes a program that is in the memory 1503 and that is executed by the foregoing network device.

The network device sends first downlink control information to a terminal device, where the first downlink control information includes first power allocation information for a plurality of transport layers, and the first power allocation information is used to indicate the terminal device to determine a first transmit power of each of the plurality of transport layers and send first uplink data based on the first transmit power of each transport layer; and receives the first uplink data sent by the terminal device.

The first uplink data includes inter-layer power allocation capability information.

Optionally, the processor 1501 is further configured to perform the following operations:

determining second power allocation information for the plurality of transport layers based on the inter-layer power allocation capability information; and sending second downlink control information to the terminal device, where the second downlink control information includes the second power allocation information for the plurality of transport layers, and the second power allocation information is used to indicate the terminal device to determine a second transmit power of each of the plurality of transport layers and send second uplink data based on the second transmit power of each transport layer.

A PMI or an SRI in the first downlink control information is the same as a PMI or an SRI in the second downlink control information.

Further, the processor may further cooperate with the memory and the communications interface to perform operations of the network device in the foregoing embodiments of this application.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or the functions according to the embodiments of this application are all or partially generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

The objectives, technical solutions, and beneficial effects of this application are further described in detail in the foregoing specific implementations. Any modification, equivalent replacement, or improvement made without departing from the spirit and principle of this application shall fall within the protection scope of this application.

What is claimed is:

1. A method of power allocation, comprising:
    receiving, by a terminal device, first downlink control information sent by a network device, wherein the first downlink control information comprises first power allocation information for a plurality of transport layers, and one of a precoding matrix indicator (PMI) or a spatial rank index (SRI);
    determining, by the terminal device, precoding used by the plurality of transport layers based on the PMI or the SRI;
    determining, by the terminal device, a first transmit power of each of the plurality of transport layers based on the first power allocation information and the precoding used by the plurality of transport layers;
    sending, by the terminal device, first uplink data based on the first transmit power of each of the plurality of transport layers; and
    when the precoding used by the plurality of transport layers is full coherent precoding, determining, by the terminal device, the first transmit power of each of the plurality of transport layers based on the first power allocation information.

2. The method according to claim 1, wherein the first downlink control information comprises codeword-transport layer-precoding correspondence indication information, and the plurality of transport layers comprise at least two groups of transport layers; and
    wherein the method further comprises:
        determining, based on the codeword-transport layer-precoding correspondence indication information, antenna ports used by the at least two groups of transport layers; and
        when the precoding used by the plurality of transport layers is partial coherent precoding, and the antenna ports used by the at least two groups of transport layers are the same, determining, by the terminal device, the first transmit power of each of the plurality of transport layers based on the first power allocation information.

3. The method according to claim 1, wherein before the sending of the first uplink data to the network device, the method further comprises:
    determining, by the terminal device, inter-layer power allocation capability information supported by each of the plurality of transport layers, wherein the first uplink data comprises the inter-layer power allocation capability information, and the inter-layer power allocation capability information determines second power allocation information for the plurality of transport layers.

4. The method according to claim 3, wherein the first downlink control information comprises codeword-transport layer-precoding correspondence indication information, and the plurality of transport layers comprise at least two groups of transport layers; and
    wherein the method further comprises:
        determining, based on the codeword-transport layer-precoding correspondence indication information, antenna ports used by the at least two groups of transport layers; and
        when the precoding used by the plurality of transport layers is non-coherent precoding or partial coherent precoding and the antenna ports used by the at least two groups of transport layers are different, determining, by the terminal device, the inter-layer power allocation capability information supported by each of the plurality of transport layers.

5. The method according to claim 3, wherein the method further comprises:
    determining the inter-layer power allocation capability information based on at least one antenna port of antenna ports used by at least two groups of transport layers and a maximum transmit power parameter of the at least one antenna port.

6. The method according to claim 4, wherein after the sending of the first uplink data to the network device, the method further comprises:
    receiving, by the terminal device, second downlink control information sent by the network device, wherein the second downlink control information comprises the second power allocation information for the plurality of transport layers;
    determining, by the terminal device, a second transmit power of each of the plurality of transport layers based on the second power allocation information; and
    sending, by the terminal device, second uplink data based on the second transmit power of each of the plurality of transport layers, wherein
    the PMI or the SRI in the first downlink control information is the same as a PMI or an SRI in the second downlink control information.

7. The method according to claim 3, wherein the first power allocation information is identified as a default state 0.

8. An apparatus, comprising:
at least one processor; and
a memory coupled to the at least one processor and storing program instructions, which, when executed by the at least one processor, cause the apparatus to:
receive first downlink control information sent by a network device, wherein the first downlink control information comprises first power allocation information for a plurality of transport layers, and one of a precoding matrix indicator (PMI) or a spatial rank index (SRI);
determine precoding used by the plurality of transport layers based on the PMI or the SRI;
determine a first transmit power of each of the plurality of transport layers based on the first power allocation information and the precoding used by the plurality of transport layers;
send first uplink data based on the first transmit power of each of the plurality of transport layers; and
when the precoding used by the plurality of transport layers is full coherent precoding, determine the first transmit power of each of the plurality of transport layers based on the first power allocation information.

9. The apparatus according to claim 8, wherein the first downlink control information comprises codeword-transport layer-precoding correspondence indication information, and the plurality of transport layers comprise at least two groups of transport layers; and
wherein the program instructions further cause the apparatus to:
determine, based on the codeword-transport layer-precoding correspondence indication information, antenna ports used by the at least two groups of transport layers; and
when the precoding used by the plurality of transport layers is partial coherent precoding, and the antenna ports used by the at least two groups of transport layers are the same, determine the first transmit power of each of the plurality of transport layers based on the first power allocation information.

10. The apparatus according to claim 8, wherein the program instructions further cause the apparatus to:
determine inter-layer power allocation capability information supported by each of the plurality of transport layers, wherein the first uplink data comprises the inter-layer power allocation capability information, and the inter-layer power allocation capability information determines second power allocation information for the plurality of transport layers.

11. The apparatus according to claim 10, wherein the first downlink control information comprises codeword-transport layer-precoding correspondence indication information, and the plurality of transport layers comprise at least two groups of transport layers; and
wherein the program instructions further cause the apparatus to:
determine, based on the codeword-transport layer-precoding correspondence indication information, antenna ports used by the at least two groups of transport layers; and
when the precoding used by the plurality of transport layers is non-coherent precoding or partial coherent precoding and the antenna ports used by the at least two groups of transport layers are different, determine the inter-layer power allocation capability information supported by each of the plurality of transport layers.

12. The apparatus according to claim 10, wherein the program instructions further cause the apparatus to:
determine the inter-layer power allocation capability information based on at least one of antenna ports used by at least two groups of transport layers and a maximum transmit power parameter of the at least one antenna port.

13. The apparatus according to claim 11, wherein the program instructions further cause the apparatus to:
receive second downlink control information sent by the network device, wherein the second downlink control information comprises the second power allocation information for the plurality of transport layers;
determine a second transmit power of each of the plurality of transport layers based on the second power allocation information; and
send second uplink data based on the second transmit power of each transport layer, wherein
the PMI or the SRI in the first downlink control information is the same as a PMI or an SRI in the second downlink control information.

14. The apparatus according to claim 10, wherein the first power allocation information is identified as a default state 0.

15. A non-transitory computer readable medium storing program instructions, which, when executed by at least one processor of an apparatus, cause the apparatus to perform operations comprising:
receiving first downlink control information sent by a network device, wherein the first downlink control information comprises first power allocation information for a plurality of transport layers, and one of a precoding matrix indicator (PMI) or a spatial rank index (SRI);
determining precoding used by the plurality of transport layers based on the PMI or the SRI;
determining a first transmit power of each of the plurality of transport layers based on the first power allocation information and the precoding used by the plurality of transport layers;
sending first uplink data based on the first transmit power of each of the plurality of transport layers; and
when the precoding used by the plurality of transport layers is full coherent precoding, determining the first transmit power of each of the plurality of transport layers based on the first power allocation information.

16. The non-transitory computer readable medium according to claim 15, wherein the first downlink control information comprises codeword-transport layer-precoding correspondence indication information, and the plurality of transport layers comprise at least two groups of transport layers; and
wherein the operations further comprise:
determining, based on the codeword-transport layer-precoding correspondence indication information, antenna ports used by the at least two groups of transport layers; and
when the precoding used by the plurality of transport layers is partial coherent precoding, and the antenna ports used by the at least two groups of transport layers are the same, determining the first transmit power of each of the plurality of transport layers based on the first power allocation information.

17. The non-transitory computer readable medium according to claim 15, wherein before the sending of the first uplink data to the network device, the operations further comprise:

determining inter-layer power allocation capability information supported by each of the plurality of transport layers, wherein the first uplink data comprises the inter-layer power allocation capability information, and the inter-layer power allocation capability information determines second power allocation information for the plurality of transport layers.

* * * * *